(12) United States Patent
Tanigawa et al.

(10) Patent No.: US 9,751,719 B2
(45) Date of Patent: Sep. 5, 2017

(54) FILAMENT WINDING DEVICE

(71) Applicants:Murata Machinery, Ltd., Kyoto-shi, Kyoto (JP); Toyota Jidosha Kabushiki Kaisha, Toyota-shi, Aichi (JP)

(72) Inventors: Motohiro Tanigawa, Kyoto (JP); Daigoro Nakamura, Kyoto (JP); Tadashi Uozumi, Kyoto (JP); Ken Hatta, Toyota (JP)

(73) Assignees: MURATA MACHINERY, LTD, Kyoto (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 237 days.

(21) Appl. No.: 14/386,157

(22) PCT Filed: Mar. 8, 2013

(86) PCT No.: PCT/JP2013/056440
§ 371 (c)(1),
(2) Date: Sep. 18, 2014

(87) PCT Pub. No.: WO2013/141042
PCT Pub. Date: Sep. 26, 2013

(65) Prior Publication Data
US 2015/0048195 A1 Feb. 19, 2015

(30) Foreign Application Priority Data
Mar. 19, 2012 (JP) .................. 2012-062476

(51) Int. Cl.
*B65H 67/06* (2006.01)
*B29C 53/60* (2006.01)
*B29C 53/80* (2006.01)

(52) U.S. Cl.
CPC ......... *B65H 67/068* (2013.01); *B29C 53/602* (2013.01); *B29C 53/8016* (2013.01)

(58) Field of Classification Search
CPC ....... B29C 53/602; B29C 53/64; B29C 53/66; B65H 67/068
See application file for complete search history.

(56) References Cited

U.S. PATENT DOCUMENTS

| 2,653,771 A * | 9/1953 | Turner ............... H01F 41/08 235/98 B |
| 2008/0197229 A1* | 8/2008 | Uozumi ............... B29C 53/66 242/478.2 |

(Continued)

FOREIGN PATENT DOCUMENTS

| JP | 04-191037 A | 7/1992 |
| JP | 2009061721 A | 3/2009 |
| JP | 2010-000693 A | 1/2010 |

OTHER PUBLICATIONS

English language translation of the international preliminary report on patentability dated Sep. 23, 2014 issued in corresponding PCT application PCT/JP2013/056440.

(Continued)

*Primary Examiner* — Emmanuel M Marcelo
(74) *Attorney, Agent, or Firm* — DLA Piper LLP (US)

(57) ABSTRACT

A filament winding device (100) comprising a liner support device (42) supporting a liner (1), and a hoop winding device (43) that winds a fiber bundle (F) on to the outer peripheral surface (1S) of the liner (1) by rotating centered around the liner (1). The filament winding device (100) is characterized by being capable of simultaneously transporting the liner (1) and the hoop winding device (43), by having the liner support device (42) and the hoop winding device (43) arranged upon a trolley (40A), and moving the trolley (40A).

5 Claims, 10 Drawing Sheets

(56) References Cited

U.S. PATENT DOCUMENTS

| | | | |
|---|---|---|---|
| 2009/0038759 A1* | 2/2009 | Uozumi | B29C 53/602 156/425 |
| 2009/0065622 A1 | 3/2009 | Uozumi et al. | |
| 2013/0068873 A1* | 3/2013 | Tanigawa | B21C 47/14 242/439.5 |

OTHER PUBLICATIONS

Japanese language international search report dated Jun. 11, 2013 and its English language translation issued in corresponding PCT application PCT/JP2013/056440.

Notification of Reason for Refusal dated Nov. 23, 2015 (Nov. 23, 2015) in corresponding Korean Application No. 10-2014-7029036 citing the foreign document above.

* cited by examiner

FILAMENT WINDING DEVICE

CROSS REFERENCE TO RELATED APPLICATIONS

This application is a national stage of international application PCT/JP2013/056440, filed on Mar. 8, 2013, and claims the benefit of priority under 35 USC 119 of Japanese application 2012-062476, filed on Mar. 19, 2012, which are incorporated herein by reference.

TECHNICAL FIELD

The present invention relates to a technique of a filament winding device.

BACKGROUND ART

Conventionally, a filament winding device which winds a fiber bundle impregnated with resin on to the outer peripheral surface of a liner has been known. The filament winding device is provided with a hoop winding device that winds the fiber bundle on to the outer peripheral surface of the liner by rotating centered around the liner (for example, see Patent Literature 1).

The hoop winding device is provided with a bobbin in which the fiber bundle has been wound, and the fiber bundle supplied from the bobbin is wound on to the liner by self-rotation of the hoop winding device. As such, with respect to the filament winding including the hoop winding device, when the fiber bundle wound on to the bobbin runs low, there is a need to interrupt the fiber bundle winding operation and exchange the bobbin. However, when the fiber bundle winding operation is interrupted so as to exchange the bobbin, a considerable time is required until the restart of the fiber bundle winding operation, and thus there is a problem of deterioration of producing efficiency Also, with respect to the foregoing filament winding device, when the winding operation of the fiber bundle on to the liner is terminated, the liner is exchanged to a new liner and then the fiber bundle winding operation is restarted. However, when the exchanging work of the liner is carried out, a considerable time is required until the restart of the fiber bundle winding operation, and thus there is a problem of deterioration of producing efficiency.

PRIOR ART DOCUMENTS

Patent Literature

Patent Literature 1: the Japanese Patent Laid Open Gazette 2009-61721

SUMMARY OF THE INVENTION

Problems to be Solved by the Invention

The object of the invention is to provide a filament winding device which can exchange a bobbin with few fiber bundles or a liner in which the fiber bundle has been already wound while carrying out the winding operation of a fiber bundle to a new liner, and can improve producing efficiency.

Means for Solving the Problems

A first aspect of the present invention is a filament winding device including: a liner support device supporting a liner; and a hoop winding device that winds a fiber bundle on to the outer peripheral surface of the liner by rotating centered around the liner. The filament winding device is capable of simultaneously transporting the liner and the hoop winding device, by having the liner support device and the hoop winding device arranged upon a trolley, and moving the trolley.

In a second aspect of the present invention, with respect to the filament winding device according to the first aspect, the filament winding device is capable of simultaneously exchanging the liner and the hoop winding device, by having at least two trolleys placed on rails, and moving the respective trolleys.

In a third aspect of the present invention, with respect to the filament winding device according to the second aspect, a work space for carrying out exchanging work of a bobbin in which the fiber bundles have been wound and the liner is provided in a vicinity of the rails.

In a fourth aspect of the present invention, with respect to the filament winding device according to the first to the third aspect, the filament winding device includes: a liner shaft supported by the liner support device in such a condition that the liner shaft is attached to the liner; and a liner transfer device which is configured to be connected to/separated from the liner shaft. With respect to the filament winding device, the trolley is movable in such a condition that the liner shaft is separated from the liner transfer device.

In a fifth aspect of the present invention, with respect to the filament winding device according to the fourth aspect, when the liner shaft is supported by the liner support device, the liner transfer device is separated from the liner shaft, and when the liner transfer device is connected to the liner shaft, the liner support device is separated from the liner shaft.

Effects of the Invention

The present invention exerts effects described below.

According to the first aspect, with respect to the filament winding device according to the present embodiment, since the liner support device and the hoop winding device are arranged upon the trolley, the liner and the hoop winding device can be simultaneously transported by moving the trolley.

According to the second aspect, with respect to the filament winding device according to the present embodiment, since the at least two trolleys are placed on rails, the liner and the hoop winding device can be simultaneously exchanged by moving the respective trolleys.

According to the third aspect, with respect to the filament winding device according to the present embodiment, since the work space for carrying out exchanging work of the bobbin in which the fiber bundles have been wound and the liner is provided in the vicinity of the rails, the bobbin with few fiber bundles or the liner in which the fiber bundle has been already wound can be exchanged while carrying out the winding operation of a fiber bundle to a new liner.

According to the fourth aspect, with respect to the filament winding device according to the present embodiment, since the filament winding device includes the liner transfer device which is configured to be connected to/separated from the liner shaft, the trolley is movable in such a condition that the liner shaft is separated from the liner transfer device.

According to the fifth aspect, with respect to the filament winding device according to the present embodiment, when the liner shaft is supported by the liner support device, the liner transfer device is separated from the liner shaft. In such a condition, the liner can be conveyed while the liner is placed on the trolley. Also, when the liner transfer device is connected to the liner shaft, the liner support device is separated from the liner shaft. In such a condition, the liner can be transferred by the liner transfer device.

DESCRIPTION OF EMBODIMENTS

Next, an explanation will be given of embodiments of the present invention.

First of all, a brief explanation will be given of an overall configuration of a filament winding device 100 (hereinafter, "FW device 100").

Figure 1:
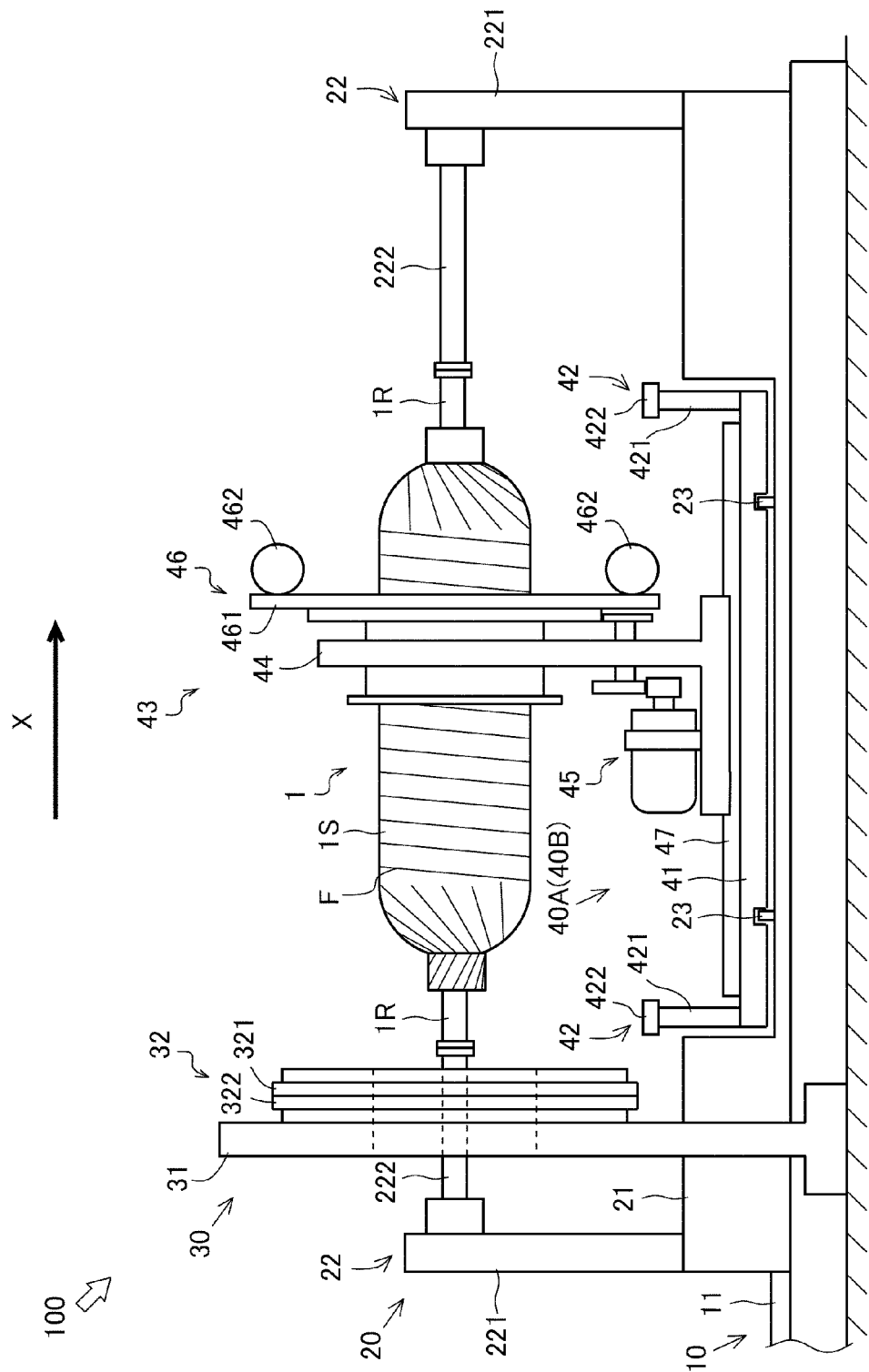
FIG. 1 is a side view illustrating an overall configuration of a filament winding device 100.

FIG. 1 is a side view illustrating the overall configuration of the FW device 100. An arrow X in the drawing indicates a transfer direction of a liner 1. The direction in parallel to the transfer direction of the liner 1 is regarded as the longitudinal direction of the FW device 100, and one direction of transferring the liner 1 is defined as the front side (right side in this drawing), and the other direction opposite thereto is defined as the rear side (left side in this drawing). The FW device 100 reciprocates the liner 1 in the longitudinal direction, whereby the front side and the rear side are defined depending on the transfer direction of the liner 1.

Figure 2:
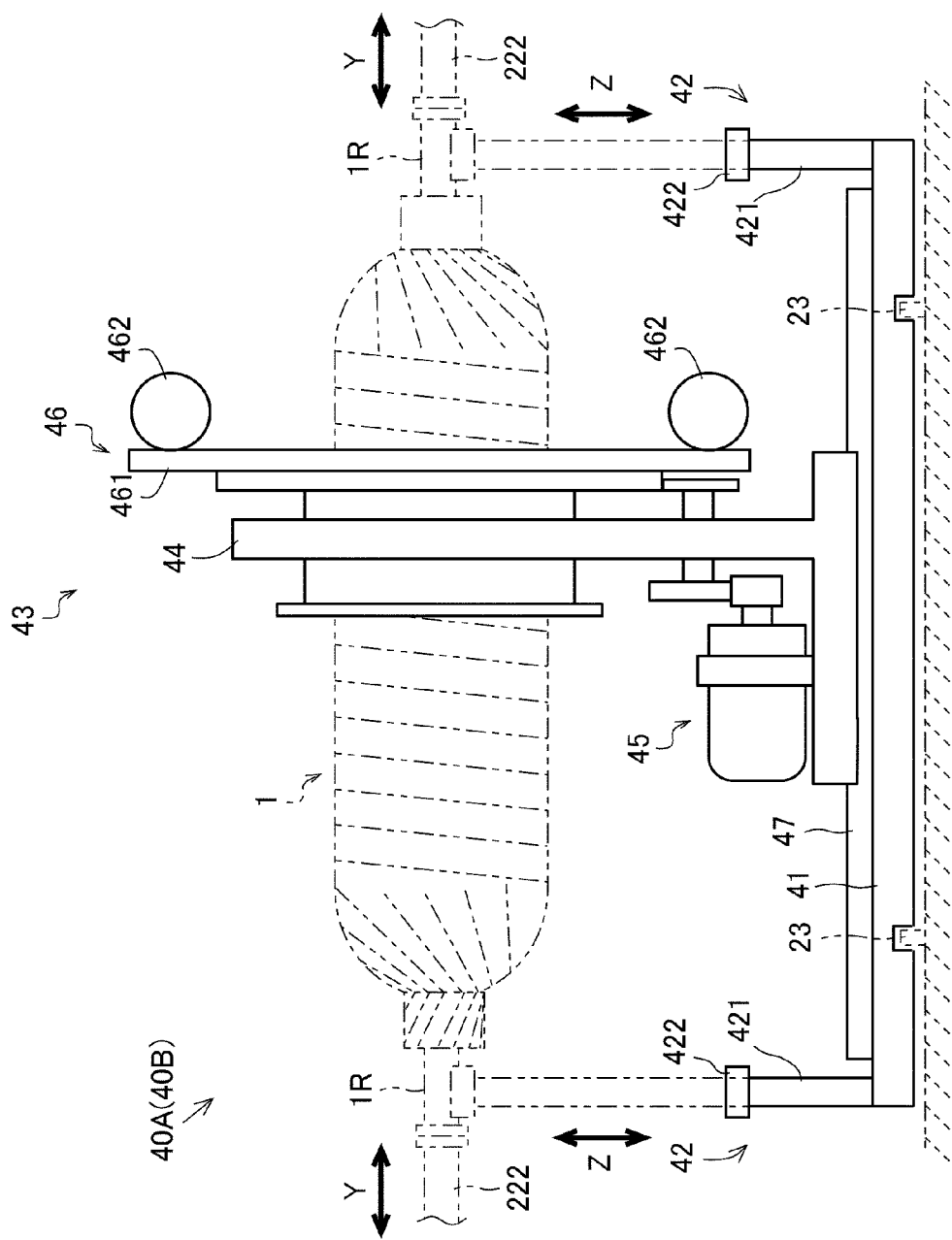
FIG. 2 is a side view illustrating a configuration of trolleys 40A, 40B.

FIG. 2 is a side view illustrating a configuration of trolleys 40A, 40B. An arrow Y in the drawing indicates a sliding direction of below-mentioned liner support shafts 222. An arrow Z in the drawing indicates a telescopic direction of a below-mentioned liner support device 42.

The FW device 100 winds a fiber bundle F on to the outer peripheral surface 1S of the liner 1. The FW device 100 mainly includes a main pedestal 10, a liner transfer device 20, a helical winding device 30, and the trolleys 40A, 40B.

The liner 1 is, for example, a substantially cylindrical hollow container formed by a high strength aluminum, polyamide resin or the like. The pressure resistance of the liner 1 is improved by winding the fiber bundle F on to the outer peripheral surface 1S of the liner 1. That is to say, the liner 1 is a base member constituting a pressure resistant hollow container.

The main pedestal 10 constitutes the foundation of the FW device 100. The upper part of the main pedestal 10 is provided with first rails 11 extending in the longitudinal direction. The liner transfer device 20 is placed on the first rails 11.

Because of this configuration, it is possible that the main pedestal 10 constitutes the foundation of the FW device 100 and the liner transfer device 20 is movable in the longitudinal direction of the FW device 100.

The liner transfer device 20 transfers the liner 1 while rotating it. In particular, the liner 1 is rotated about the longitudinal direction of the FW device 100 as a center axis, and is transferred in the longitudinal direction of the FW device 100 by the liner transfer device 20. The liner transfer device 20 mainly includes a pedestal 21 and liner support parts 22.

For the pedestal 21, the upper part of the pedestal 21 is provided with the pair of liner support parts 22. The liner support part 22 includes a liner support frame 221 and the liner support shafts 222, and thereby rotates the liner 1. Specifically, the liner support part 22 includes: the liner support frame 221 extended upward from the pedestal 21; and the liner support shafts 222 extended longitudinally from the liner support frame 221. In a state where the liner 1 is attached to the liner support shafts 222, the liner 1 is rotated in one direction via a power mechanism (not shown).

Because of this configuration, it is possible that the liner 1 is rotated about the longitudinal direction of the FW device 100 as a center axis and is transferred in the longitudinal direction of the FW device 100 by the liner transfer device 20.

With respect to the present FW device 100, a liner shaft 1R is attached to the liner 1. This is for attaching the liner 1 to the liner support shafts 222. The liner support shaft 222 is respectively slidable in the direction where the liner support shaft 222 and the liner shaft 1R may come close or separate (see the arrows Y in FIG. 2). Accordingly, the liner support shaft 222 is capable of being connected to/separated from the liner shaft 1R. That is to say, the liner transfer device 20 is configured to be connected to/separated from the liner shaft 1R.

Also, the upper part of the pedestal 21 is provided with second rails 23 extending perpendicularly to the first rails 11. The trolley 40A is placed on the second rails 23. Also, the trolley 40B other than the trolley 40A is placed on the second rails 23 (see FIG. 4 to FIG. 9). Accordingly, with respect to the present FW device 100, the trolley 40A and the trolley 40B are capable of moving in a perpendicular direction to the longitudinal direction of the FW device 100.

The helical winding device 30 winds the fiber bundle F on to the outer peripheral surface 1S of the liner 1. In particular, the helical winding device 30 performs so-called helical winding in which the winding angle of the fiber bundle F is set to be a prescribed value relative to the longitudinal direction. The helical winding device 30 mainly includes a pedestal 31 and a helical wrapping device 32.

The pedestal 31 is provided with the helical wrapping device 32. The helical wrapping device 32 includes a fixed helical head 321 and a movable helical head 322, thereby the helical wrapping device 32 performs helical winding on to the outer peripheral surface 1S of the liner 1. Specifically, the helical wrapping device 32 mainly includes: the fixed helical head 321 that performs helical winding; and the movable helical head 322 that performs helical winding as well. The fiber bundle F is led to the outer peripheral surface 1S of the liner 1 with a fiber bundle guide which is provided to the fixed helical head 321 and a fiber bundle guide which is provided to the movable helical head 322, and thereby helical winding is performed on to the liner 1 passing through while rotating.

Because of this configuration, it is possible that the helical winding device 30 performs helical winding, where the winding angle of the fiber bundle F is set to be the prescribed value relative to the longitudinal direction of the FW device 100.

The trolleys 40A, 40B carry the liners 1 in the liner transfer device 20 in such a condition that the liners 1 are placed on the trolleys 40A, 40B. And, the trolleys 40A, 40B carry the liners 1 out of the liner transfer device 20 in such a condition that the liners 1 are placed on the trolleys 40A, 40B. The trolleys 40A, 40B respectively includes a pedestal 41, the liner support device 42, and a hoop winding device 43. Since the trolley 40A and the trolley 40B have the same configuration with each other, explanation will be given only of the trolley 40A.

For the pedestal 41, the upper part of the pedestal 41 is provided with the pair of liner support devices 42. The liner support device 42 includes a seat lift part 421 and a seat part 422, and thereby being capable of supporting the liner 1. Specifically, the liner support device 42 includes: the seat lift part 421 that is arranged so as to face upward from the pedestal 41; and the seat part 422 that is attached to the upper portion of the seat lift part 421. When the seat lift part 421 is extending upward, the liner 1 is supported by the seat part 422. With respect to the liner support device 42 according to the present embodiment, the liner 1 is capable of being supported by the seat parts 422 when the liner shafts 1R attached to the liner 1 comes into contact with the seat parts 422.

The upper part of the pedestal 41 is provided with third rails 47 extending in parallel with the first rails 11. The hoop winding device 43 is placed on the third rails 47. Accordingly, it is possible that the hoop winding device 43 is moved in parallel with the longitudinal direction of the FW device 100 by the FW device 100.

The hoop winding device 43 winds the fiber bundle F on to the outer peripheral surface 1S of the liner 1. In particular, the hoop winding device 43 performs so-called hoop winding in which the winding angle of the fiber bundle F is set to be substantially perpendicular to the longitudinal direction of the FW device. The hoop winding device 43 mainly includes a pedestal 44, a power mechanism 45, and a hoop wrapping device 46.

The pedestal 44 is provided with the hoop wrapping device 46 which is rotated by the power mechanism 45. The hoop wrapping device 46 includes a winding table 461 and bobbins 462, and thereby performs hoop winding on to the outer peripheral surface 1S of the liner 1. Specifically, the hoop wrapping device 46 mainly includes the winding table 461 that performs hoop winding, and the bobbins 462 that supply the fiber bundles F to the winding table 461. The fiber bundle F is led to the outer peripheral surface 1S of the liner 1 through a fiber bundle guide 464 (see FIG. 3) that is mounted on the winding table 461, and by rotating the winding table 461, hoop winding is performed.

Because of this configuration, it is possible that the hoop winding device 43 performs hoop winding, where the winding angle of the fiber bundle F is set to be substantially perpendicular to the longitudinal direction of the FW device 100.

Here, further detailed explanation will be given of the configuration of the hoop winding device 43 with reference to FIG. 3.

Figure 3:
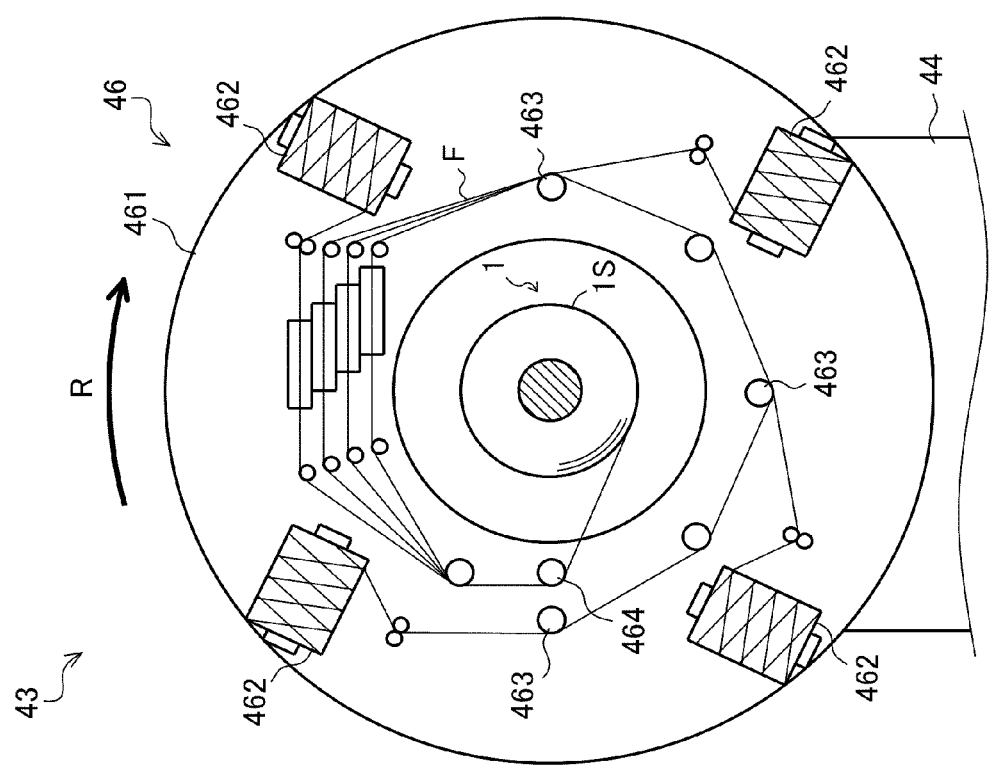
FIG. 3 is a front view illustrating a configuration of a hoop winding device 43.

FIG. 3 is a front view illustrating the configuration of the hoop winding device 43. An arrow R in the drawing indicates the rotation direction of the hoop winding device 43.

The hoop winding device 43 includes the bobbins 462 in which the fiber bundles F are wound, and by self-rotation of the hoop winding device 43, the fiber bundles F supplied from the bobbins 462 are wound on to the liner 1. In particular, the winding table 461 of the hoop winding device 43 and the bobbins 462 are rotated in an integrated manner so that the fiber bundles F are wound on to the outer peripheral surface 1S of the liner 1.

A through hole which penetrates in the longitudinal direction of the FW device 100 is formed on the winding table 461, and thereby the winding table 461 is formed into a substantially circular ring shape. As mentioned above, the liner transfer device 20 is capable of transferring the liner 1 in the longitudinal direction, and the hoop winding device 43 is capable of moving in the longitudinal direction. As such, the liner 1 can be inserted into the winding table 461.

Also, the winding table 461 is provided with guide rollers 463 and the fiber bundle guide 464. The guide rollers 463 guide the fiber bundles F supplied from the bobbins 462 to the fiber bundle guide 464. The fiber bundle guide 464 leads the fiber bundles F which are guided through the guide rollers 463 to the outer peripheral surface 1S of the liner 1.

Because of this configuration, the hoop winding device 43 is capable of winding the fiber bundle F on to the outer peripheral surface 1S of the liner 1 by rotating centered around the liner 1.

Next, assuming that winding operation of the fiber bundle F on to the liner 1 is terminated, an explanation will be given of an aspect where the liner 1 is exchanged to a new liner 1, and the winding operation of the fiber bundle F is restarted.

The FW device 100 is characterized in that being capable of simultaneously exchanging the liner 1 and the hoop winding device 43 when winding operation of the fiber bundle F to the liner 1 is terminated. With respect to the present FW device 100, the length of the fiber bundles F wound on to the bobbins 462 are set to lengths that do not run low during the winding operation of the fiber bundle F.

When winding operation of the fiber bundle F to the liner 1 is terminated, the FW device 100 stops all of the winding operations. Here, "all of the winding operations" include for example the rotation operation and the transfer operation of the liner 1 that are carried out by the liner transfer device 20, and means all of the operations which are carried out for winding the fiber bundle F.

Figure 4:
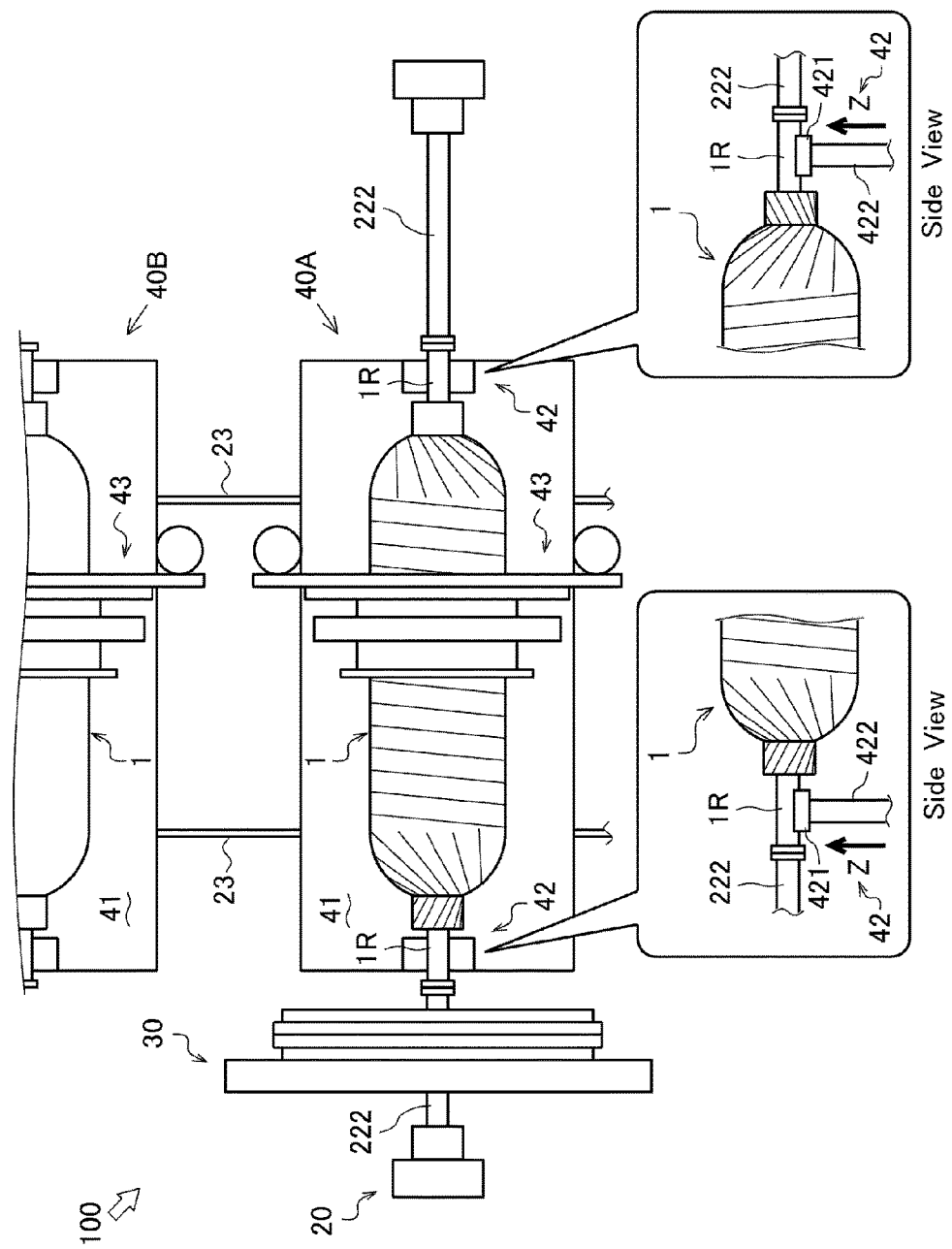
FIG. 4 is a plane view illustrating a state where a liner shaft 1R is supported by a liner support device 42.

First of all, with respect to the FW device 100, as shown in FIG. 4, the liner 1 is supported by the liner support devices 42 that are provided with the trolley 40A. Specifically, for the FW device 100, the liner shaft 1R attached to the liner 1 is supported by the seat part 422, by having the seat part 422 of the liner support device 42 moved from a standby position to upward (see arrows Z in the drawing).

Figure 5:
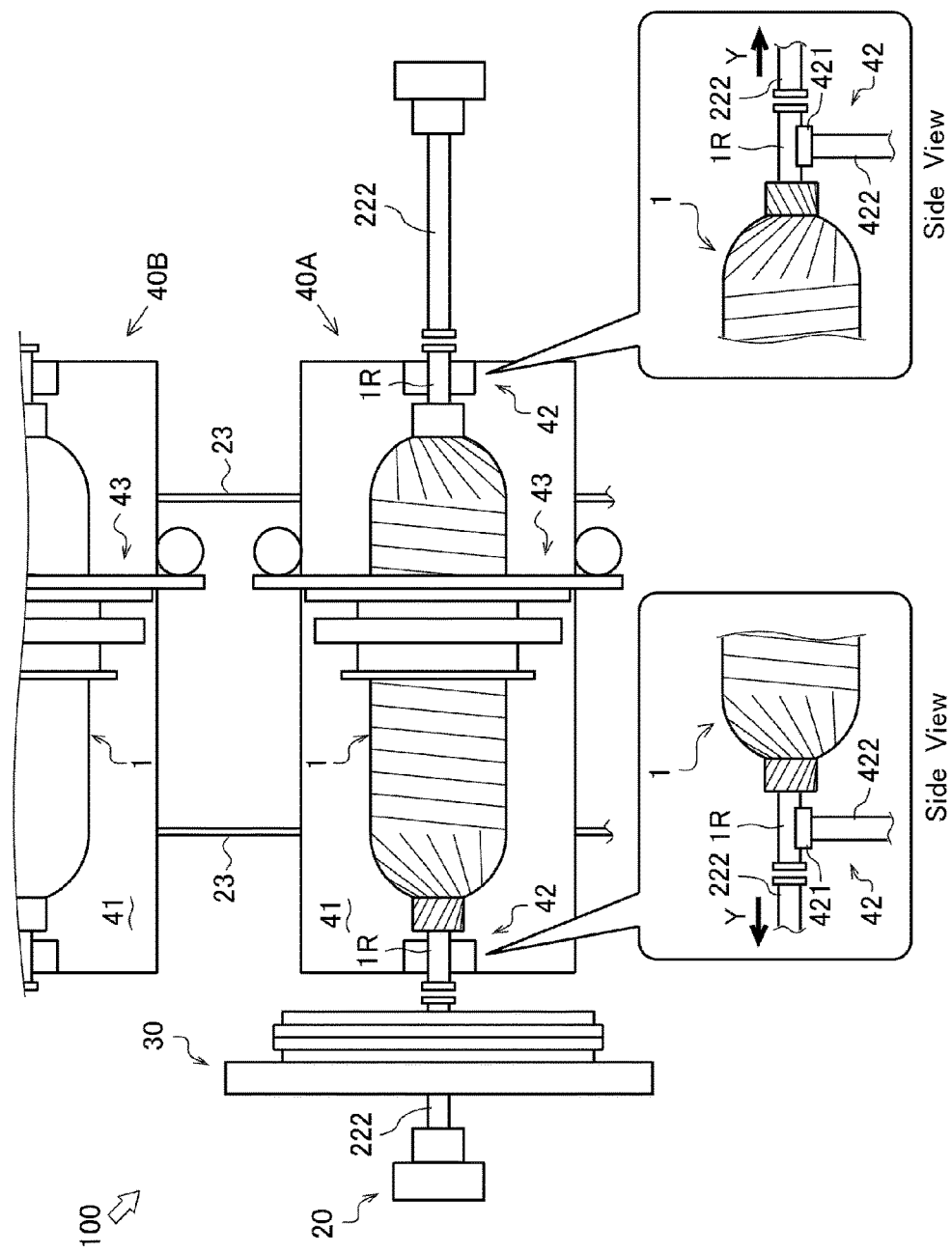
FIG. 5 is a plane view illustrating a state where a liner transfer device 20 is separated from the liner shaft 1R.

Next, with respect to the FW device 100, as shown in FIG. 5, the liner support shafts 222 are slid so as to separate the liner support shafts 222 from the liner shafts 1R. Specifically, for the FW device 100, the liner support shaft 222 is slid to a separating direction from the liner shaft 1R (see arrows Y in the drawing) in order to separate the liner support shaft 222 from the liner shaft 1R. As such, the liner support device 42 makes a gap sized so as to pass through at least the trolley 40A and the trolley 40B.

Figure 6:
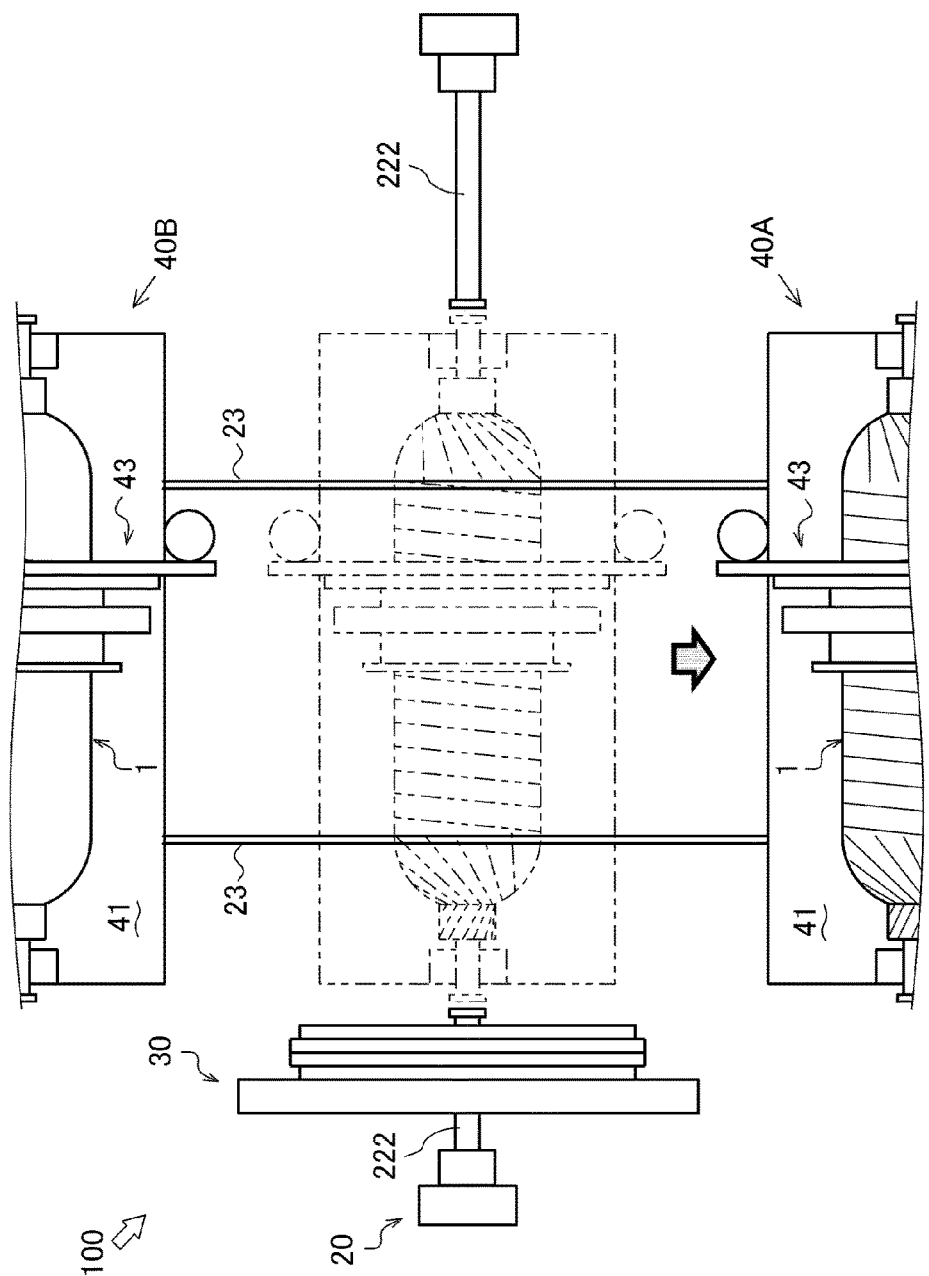
FIG. 6 is a plane view illustrating a state where the trolley 40A is moved to a predetermined position.

Next, as shown in FIG. 6, the trolley 40A on which the liner 1 is placed is moved by the FW device 100. Specifically, the trolley 40A on which the liner 1 is placed is moved along the second rails 23 by the FW device 100. As such, the FW device 100 is capable of carrying the liner 1 out of the liner transfer device 20. Since the hoop winding device 43 is arranged on the trolley 40A, the hoop winding device 43 is moved with the liner 1. That is to say, the present FW device 100 is capable of carrying in (out) the liner 1 and the hoop winding device 43 simultaneously.

Figure 7:
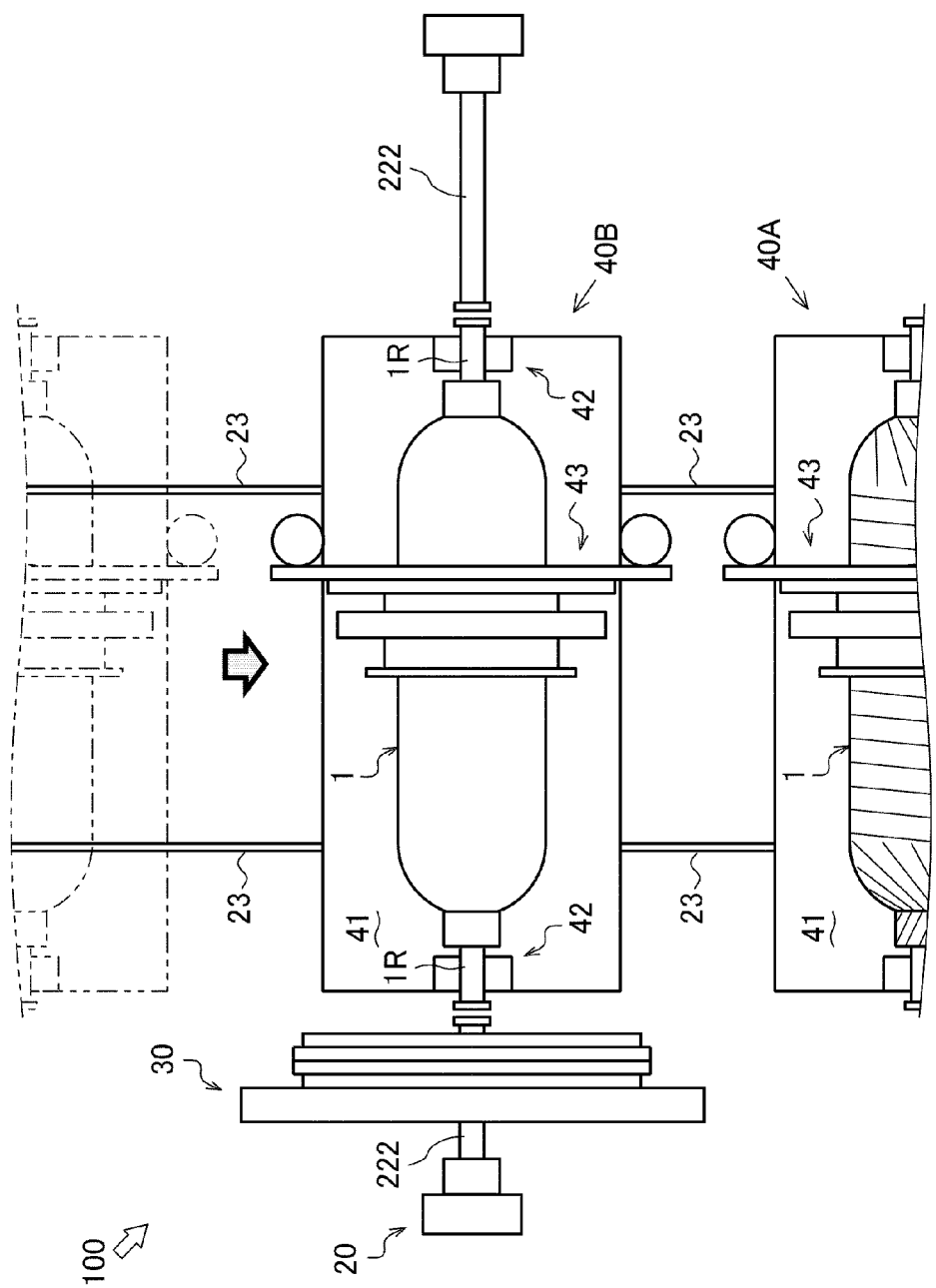
FIG. 7 is a plane view illustrating a state where the trolley 40B is moved to a predetermined position.

Next, as shown in FIG. 7, the trolley 40B on which a new liner 1 is placed is moved by the FW device 100. Specifically, the trolley 40B on which the new liner 1 is placed is moved along the second rails 23 by the FW device 100. As such, the FW device 100 is capable of carrying the new liner 1 in the liner transfer device 20. Since the hoop winding device 43 is arranged on the trolley 40B, the hoop winding device 43 is moved with the new liner 1. That is to say, the present FW device 100 is capable of carrying in (out) the new liner 1 and the hoop winding device 43 simultaneously.

Figure 8:
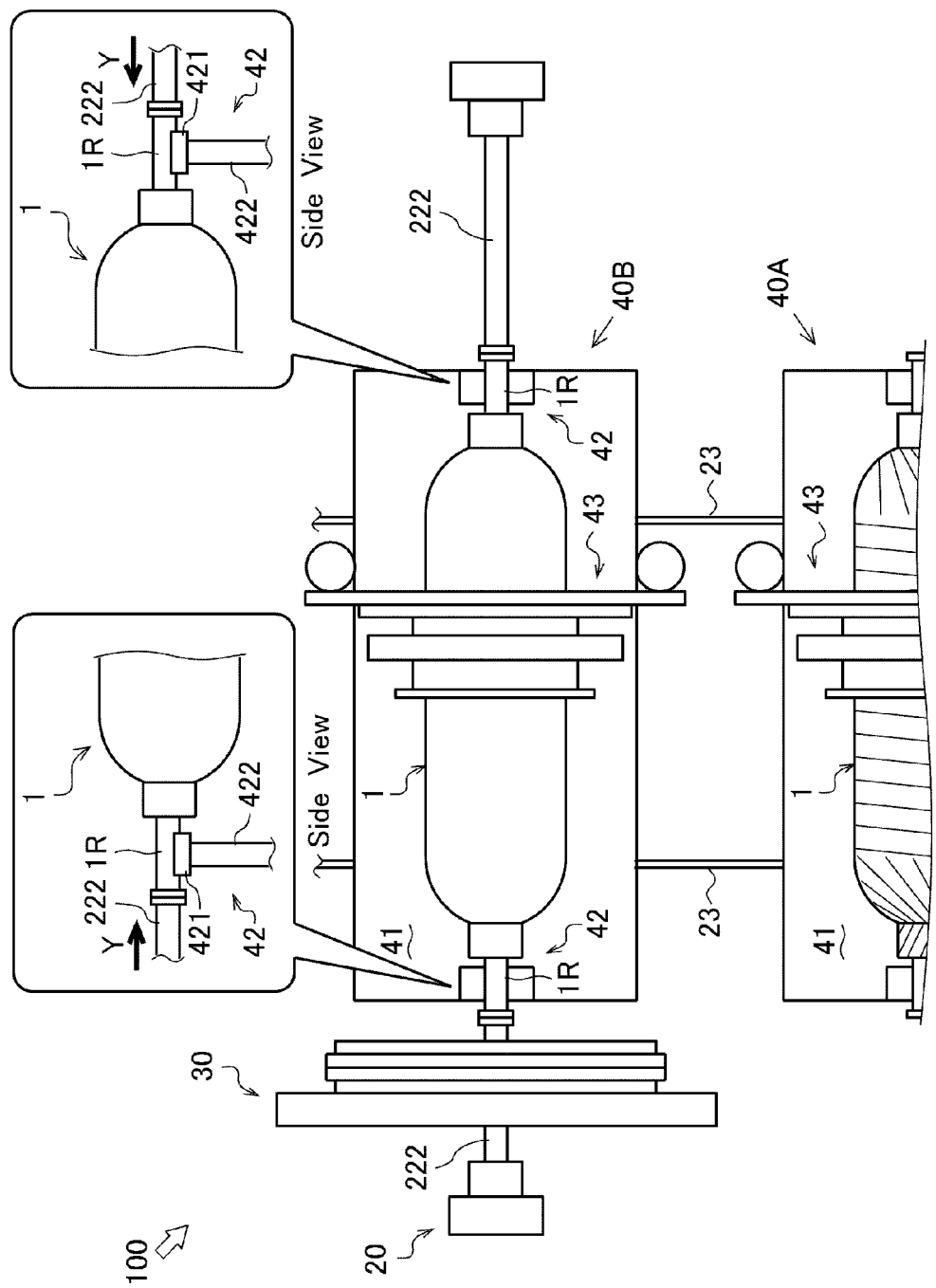
FIG. 8 is a plane view illustrating a state where the liner transfer device 20 is connected to the liner shaft 1R.

Next, with respect to the FW device 100, as shown in FIG. 8, the liner support shafts 222 are slid so as to connect the liner support shafts 222 with the liner shafts 1R. Specifically, for the FW device 100, the liner support shaft 222 is slid to an approaching direction to the liner shaft 1R (see arrows Y in the drawing), and thereby the liner support shaft 222 is connected with the liner shaft 1R. As such, the liner 1 is capable of rotating integrally with the liner support shafts 222 through the liner shafts 1R.

Figure 9:
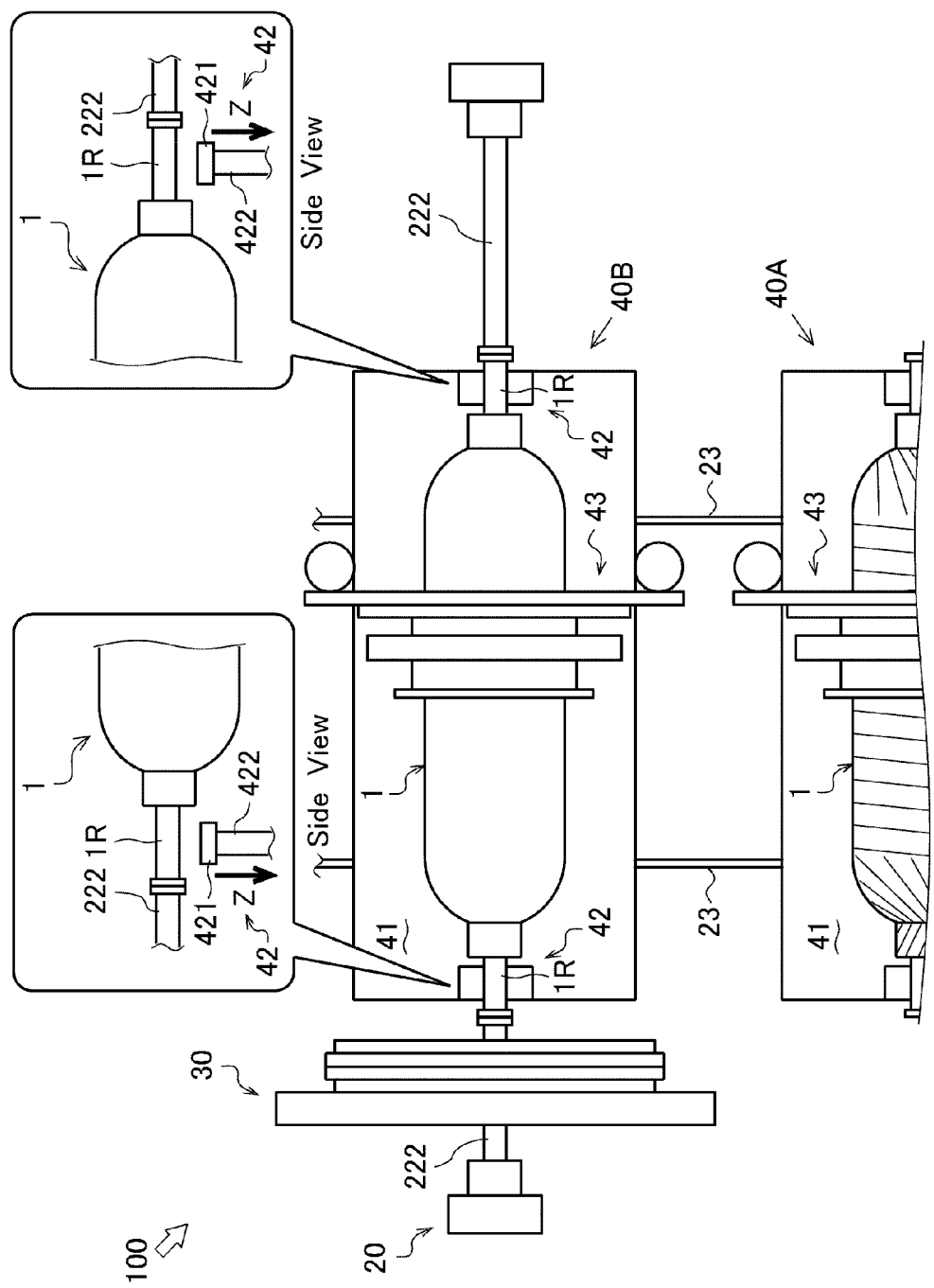
FIG. 9 is a plane view illustrating a state where the liner support device 42 is separated from the liner shaft 1R.

Next, with respect to the FW device 100, as shown in FIG. 9, the liner support devices 42 are spaced apart from the liner shafts 1R. Specifically, for the FW device 100, the seat part 422 of the liner support device 42 is put away to the standby position, by having the seat part 422 moved downward (see arrows Z in the drawing). As such, the FW device 100 is capable of avoiding interference of the liner support device 42 and the helical winding device 30 even if the liner 1 is transferred to the longitudinal direction of the FW device 100.

As described above, with respect to the present FW device 100, since the liner support devices 42 and the hoop winding devices 43 are arranged on the trolleys 40A, 40B, the liner 1 and the hoop winding device 43 are capable of being transported simultaneously, by moving the trolleys 40A, 40B. Moreover, with respect to the present FW device 100, the liner 1 and the hoop winding device 43 are capable of being exchanged simultaneously, by having the at least two trolleys 40A, 40B placed on rails (the second rails 23), and moving the respective trolleys 40A, 40B.

Figure 10:
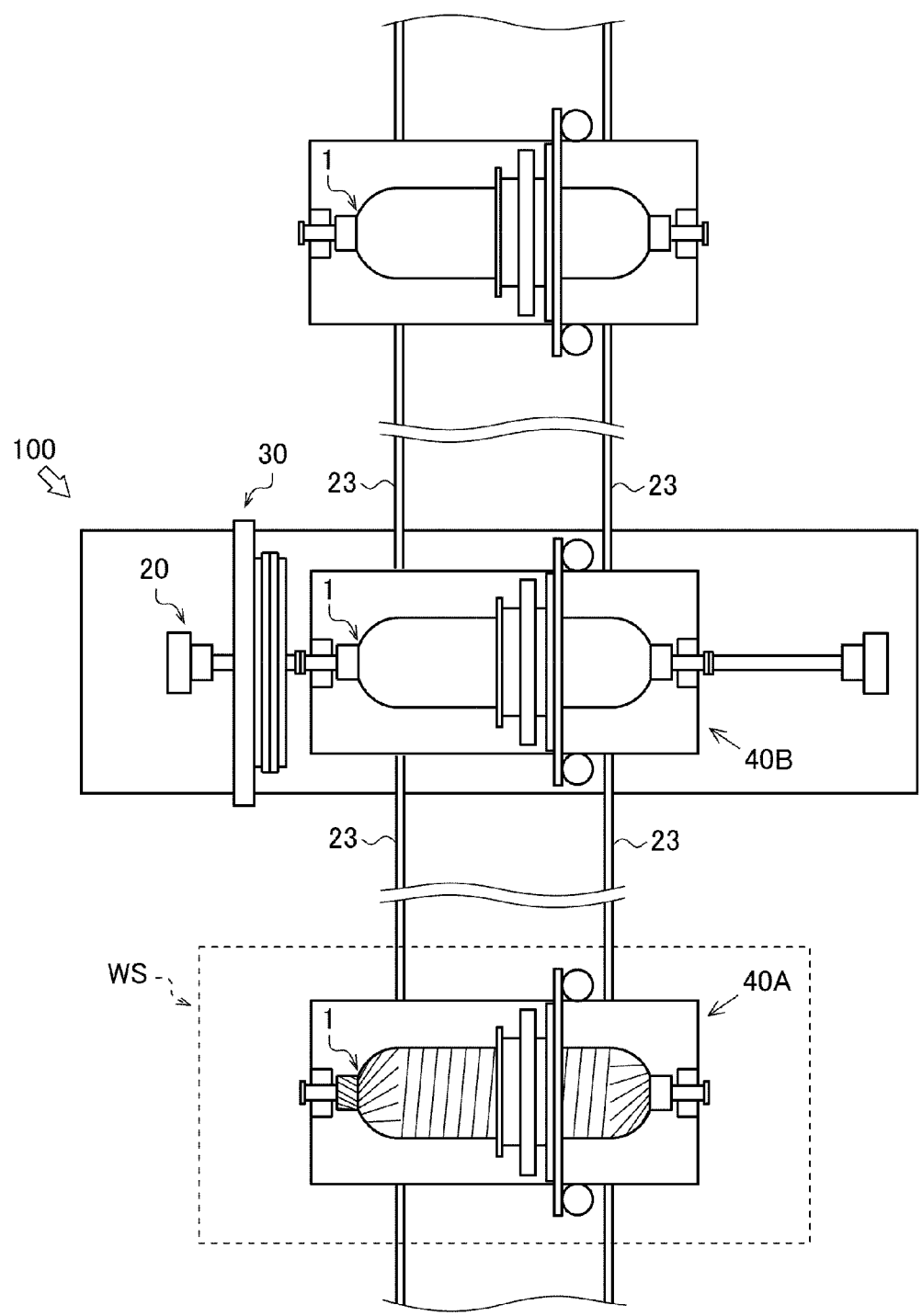
FIG. 10 is a plane view illustrating a state where the trolley 40A has moved to a work space WS.

Also, as shown in FIG. 10, the present FW device 100 is characterized in that a work space WS for carrying out exchanging work of the bobbins 462 in which the fiber bundles F have been wound and the liner 1 are provided in the vicinity of the rails 23.

As such, with respect to the present FW device 100, since the work space WS for carrying out exchanging work of the bobbins 462 in which the fiber bundle F have been wound and the liner 1 are provided in the vicinity of the rails 23, the bobbins 462 with few fiber bundles F or the liner 1 in which the fiber bundle F has been already wound can be exchanged while carrying out the winding operation of the fiber bundle F to the new liner 1.

Furthermore, with respect to the present FW device 100, exchanging work of the bobbins 462 and the liner 1 of the trolley 40A which has been moved to the work space WS can be carried out at an arbitrary time. Accordingly, for the present FW device 100, workability and maintainability have been improved.

INDUSTRIAL APPLICABILITY

The present invention can be utilized to a technique of a filament winding device.

DESCRIPTION OF NOTATIONS

1 liner
1S outer peripheral surface
1R liner shaft
10 main pedestal
20 liner transfer device
22 liner support part
222 liner support shaft
23 rails (second rails)
30 helical winding device
40A trolley
40B trolley
41 pedestal
42 liner support device
422 seat part
43 hoop winding device
462 bobbin
100 filament winding device (FW device)
F fiber bundle
WS work space

What is claimed is:

1. A filament winding device comprising:
   a liner support device supporting a liner; and
   a hoop winding device that winds a fiber bundle on to an outer peripheral surface of the liner by rotating centered around the liner,
   wherein the filament winding device is capable of simultaneously transporting the liner and the hoop winding device, by having the liner support device and the hoop winding device arranged upon a trolley, and moving the trolley.

2. The filament winding device according to claim 1, wherein the filament winding device is capable of simultaneously exchanging the liner and the hoop winding device, by having at least two trolleys placed on rails, and moving the trolleys.

3. The filament winding device according to claim 2, wherein a work space for carrying out exchanging work of a bobbin in which the fiber bundles have been wound and the liner is provided in a vicinity of the rails.

4. The filament winding device according to claim 1 comprising:
   a liner shaft supported by the liner support device in such a condition that the liner shaft is attached to the liner; and
   a liner transfer device which is configured to be connected to/separated from the liner shaft, wherein
   the trolley is movable in such a condition that the liner shaft is separated from the liner transfer device.

5. The filament winding device according to claim 4, wherein
   when the liner shaft is supported by the liner support device, the liner transfer device is separated from the liner shaft, and
   when the liner transfer device is connected to the liner shaft, the liner support device is separated from the liner shaft.

* * * * *